US006451452B1

(12) United States Patent
Niegel et al.

(10) Patent No.: US 6,451,452 B1
(45) Date of Patent: *Sep. 17, 2002

(54) OVERLAY MATERIAL FOR PLAIN BEARING

(75) Inventors: Fritz Niegel, Oestrich-Winkel; Karl-Heinz Gruenthaler, Usingen; Werner Lucchetti, Walluf; Hans-Ulrich Huhn, Schlangenbad-Wambach, all of (DE)

(73) Assignee: Federal-Mogul Weisbaden GmbH & Co. KG, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/993,806

(22) Filed: Nov. 6, 2001

Related U.S. Application Data

(63) Continuation of application No. 09/108,785, filed on Jul. 2, 1998, now abandoned.

(30) Foreign Application Priority Data

Jul. 5, 1997 (DE) .......................... 197 28 777

(51) Int. Cl.[7] .......................... B32B 15/20; F16C 33/12
(52) U.S. Cl. .................. 428/648; 428/675; 428/677; 384/912
(58) Field of Search .................. 428/646, 647, 428/648, 674, 675, 677; 384/912

(56) References Cited

U.S. PATENT DOCUMENTS

| 4,795,682 A | 1/1989 | Turner et al. |
| 5,279,638 A | 1/1994 | Asada et al. |
| 5,326,384 A | 7/1994 | Asada et al. |
| 5,413,756 A | 5/1995 | Sahu |
| 5,445,896 A | 8/1995 | Tanaka et al. |
| 5,911,513 A | 6/1999 | Tsuji et al. |
| 6,025,081 A | 2/2000 | Ohshiro et al. |

FOREIGN PATENT DOCUMENTS

| DE | 756154 | 10/1950 |
| DE | 2261789 | 6/1974 |
| DE | 2722144 | 11/1978 |
| DE | 4411762 | 10/1995 |
| DE | 19545427 | 7/1996 |
| DE | 3917694 | 3/1997 |
| DE | 19622166 | 12/1997 |
| GB | 566360 | 12/1944 |

OTHER PUBLICATIONS

Glyco Ingenieurberichte 1/91 Hochleistungsfahige metallische Mehrschicht–Verbundwerkstoffe fur Gleitlager.

*Primary Examiner*—John J. Zimmerman
(74) *Attorney, Agent, or Firm*—Reising, Ethington, Barnes, Learman & McCulloch, P.C.

(57) ABSTRACT

A lead-free multilayer material for plain bearings and a process for the production of corresponding bearing shells for improved emergency running and mechanical load-carrying capacity characteristics. The multilayer bearing material comprises a lead-free copper alloy having a copper content ranging from 50 to 95 wt. %, and an overlay formed of a lead-free tin and copper having a tin content ranging from 70 to 97 wt. % and a copper content ranging from 3 to 20 wt. %.

12 Claims, No Drawings

OVERLAY MATERIAL FOR PLAIN BEARING

This application is a continuation of application Ser. No. 09/108,785, filed Jul. 2 1998, now abandoned the priority of which is claimed.

BACKGROUND OF THE INVENTION

1. Field of the Invention

The invention relates to a composite multilayer material for plain bearings, comprising a ternary layer, a bearing metal layer, a diffusion barrier layer and an overlay applied by electroplating. The invention also relates to a process for the production of bearing shells.

2. Description of Related Art

Composite multilayer materials with a structure comprising steel backing/lead-bronze/lead-tin-copper overlay have proven very reliable and to have a high mechanical load carrying capacity. Such composite multilayer materials are described in *Glyco Ingenieurberichte* 1/91, for example.

A typical representative of these groups of materials has the following structure:

steel

CuPb22Sn bearing metal nickel barrier

PbSn10Cu2 overlay.

The electrodeposited overlay in particular is a multifunctional material, which, inter alia, takes on the following tasks:

embedability with respect to foreign particles running-in or conformability of sliding counterparts corrosion protection for the lead-bronze emergency running properties in the case of an oil shortage.

The bearing metal likewise contains certain emergency running reserves in case the overlay is completely worn away.

These bearing designs, which have proven effective for decades, today still contain quantities of lead in the bearing metal and the overlay. This is unsatisfactory from the point of view of the environmental impact of heavy metals.

The only lead-free plain bearings currently produced are aluminum-based. Two-component bearings comprising an aluminum alloy on steel are preferably used. Alloy elements in the aluminum are preferably tin, silicon, nickel and copper. Disadvantages of these groups of materials are their low fatigue strength, low notch sensitivity, low heat resistance, insufficient embedability and relatively poor heat conductivity.

Electrodeposition has hitherto mainly been carried out using baths containing fluoroborate. Copper deposition could be carried out only up to a rate of 2 vol. % in these baths, while in cyanide baths deposition rates for the copper of up to 20 vol. % could be achieved. However, it has become clear that the coating is extremely brittle and in this respect is not very durable.

DE-OS 27 22 144 discloses the use, as a soft metal bearing alloy for multilayer plain bearings, of an alloy comprising more than 6 to 10 wt. % copper and 10 to 20 wt. % tin, the rest being lead. This alloy may, inter alia, be applied by electrodeposition, wherein a nickel intermediate layer is provided as a diffusion barrier. However, this known alloy, which is produced using conventional electrolyte baths, exhibits coarse tin distribution.

The coating of electronic components is described in "galvanisches Abscheiden von Zinn-Blei aus Fluoroborat und fluorboratfreien Elektrolyten" ("Electrodeposition of tin-lead from fluoroborate and fluoroborate-free electrolytes") by H. van der Heijden in "*Metalloberfläche*" ("Metal surface") 39 (1985) 9, pages 317–320. It has been shown that tin and lead may be easily dissolved in various organic sulphonic acids with the general formula $RSO_3H$, wherein R represents an alkyl group. The sulphonic acids are described as completely stable during electrolysis. The use of such fluoroborate-free baths for electroplating of sliding elements is mentioned, as are suitable additives necessary for the production of sliding elements.

Aqueous, acidic solutions are known from DE 39 02 042 A1 for the electrolytic deposition of tin and/or lead-tin alloys. These binary electroplating baths are used as corrosion protection, e.g. for printed circuit boards and batteries, wherein a relatively soft layer is deposited which is not wear-resistant and thus cannot be used for sliding elements. In addition to metal salts, inhibitors and free alkanesulphonic acids, these known electroplating baths comprise brighteners, which make it impossible to use these baths for example as ternary baths. It has been shown that, when copper salts are added for example, only a maximum of 1% copper may be deposited, because the bath composition is essentially suited to tin.

JP 02/93096A (Pat. Abstract of Japan, C-732, Vol. 14/No. 294) describes a process for producing sliding elements, in which the overlay of Pb—Sn—Cu is applied to the prefabricated semi-finished product by electroplating. To this end, a fluoroborate-free electrolyte is used which does not contain brighteners but does contain free alkylsulphonic acid and non-ionic wetting agents. With these known electroplating baths, however, again only coarse tin deposition is achieved, wherein the layer structure is generally irregular. The high demands made of plain bearing are not met wholly satisfactorily.

DE 195 45 427 likewise describes fluoroborate-free electroplating baths for the production of overlays of lead-tin-copper, said baths containing a grain-refining agent comprising carboxylic acid and a fatty acid glycol ester. In this way, finely crystalline deposition of the tin is achieved with completely homogenous distribution thereof, copper deposition of from 2 to 16 wt. % being obtained.

The prior German Application DE 196 22 166 describes ternary layers with hard particles, wherein fluoroborate-free electroplating baths with added alkylsulphonic acid are used for the overlay, to obtain a completely homogenous distribution of the hard particles in the matrix material. In addition to lead-containing overlays, these alkylsulphonic acid baths may also be used for the application of lead-free layers of SnCuNi, Sn, SnCu and CuSn. However, it has been shown that, although copper contents of up to 16% may be obtained with these lead-free layers, these layers do not exhibit satisfactory properties as far as mechanical load carrying capacity and fatigue strength are concerned.

SUMMARY OF THE INVENTION

The object of the invention is therefore that of providing a lead-free composite multilayer material which exhibits at least the positive characteristics with respect to reliability, emergency running properties and mechanical load carrying capacity which are exhibited by conventional lead ternary bearing materials. It is also the object of the invention to provide a process for producing bearing shells.

DETAILED DESCRIPTION OF THE PREFERRED EMBODIMENTS

The object is achieved, with regard to the composite multilayer material, in that the bearing metal layer consists of a lead-free copper alloy with a copper content of from 50 to 95 wt. % and in that the overlay consists of a lead-free alloy comprising tin and copper, the copper content amounting to from 3 to 20 wt. % and the tin content to from 70 to 97 wt. %.

Lead-free copper alloys are already known from bush production (c.f. *"Lagerwerkstoffe auf Kupferbasis"* ("Copper-based bearing materials") Deutsches Kupferinstitut e.V. 1961) and have proven effective. However, bushes are exposed to lower mechanical loads and lower rotational speeds than bearing shells. For this reason, consideration has not hitherto been given to the use of these materials for bearing shells. However, it has emerged that such copper materials are suitable for bearing shells if an overlay is additionally applied.

Since it was also necessary to omit lead from the overlay, there was not complete freedom of choice with regard to the overlay material to be used in conjunction with the lead-free bearing material. It has emerged that tin-copper alloys exhibit the best results in relation to corrosion resistance, load carrying capacity and embeddability when the copper content is between 5 and 20%.

The bearing metal layer preferably consists of a copper-aluminum, copper-tin, copper-zinc, copper-zinc-silicon, copper-zinc-aluminum or copper-aluminum-iron alloy. Examples are CuAl8, CuSn8, CuZn33, CuZn31Si, CuZn40Al2 or CuAl10Fe.

The overlay may contain bismuth and/or silver and/or nickel each in a proportion of no more than 20 wt. %.

The overlay may additionally comprise hard particles, wherein $Al_2O_3$, $Si_3N_4$, diamond, $TiO_2$ or SiC are possible materials. These hard particles may be included in the overlay on their own or in combination.

The diffusion barrier layer may consist of a nickel layer from 1 to 3 $\mu$m thick and a nickel-tin layer from 2 to 10 $\mu$m thick deposited thereon. In another variant the diffusion barrier layer consists of cobalt, which may likewise have a thickness of from 1–3 $\mu$m.

The process for producing bearing shells provides that firstly the bearing metal of lead-free copper material is cast onto steel strip, wherein it may be necessary to provide wetting agent layers of nickel, tin or copper on the steel strip depending on the wettability of the bearing metal melt with respect to the steel strip. Such layers are produced in electroless manner, by electroplating or by the molten state method and are preferably from 1 to 20 $\mu$m thick.

Adjustment of the fine-grained structure of the bearing metal is effected by a combination of metal working and heat treatment processes.

After this thermomechanical treatment of the composite material, bearing shells are pressed therefrom. The bearing shells are provided with a diffusion barrier layer of nickel, nickel/nickel-tin or cobalt and a tin-based lead-free overlay by electroless chemical or electrochemical processes.

A ternary, fluoroborate-free electroplating bath is used from which brighteners are omitted but to which there are added non-ionic wetting agents and free alkylsulphonic acid, a fatty acid polyglycol ester and a grain-refining agent comprising a carboxylic acid also being used.

Hard material particles are dispersed in the bath especially to increase wear-resistance. The addition of suitable wetting agents to the bath makes it possible to codeposit the particles with the overlay.

The percentages by volume of the dispersate amount to up to 20%, the particle size amounting on average to $\leq 1$ $\mu$m.

Obviously, many modifications and variations of the present invention are possible in light of the above teachings. It is, therefore, to be understood that within the scope of the appended claims, the invention may be practiced otherwise than as specifically described.

What is claimed is:

1. A composite multilayer material for plain bearing comprising:
    a metallic backing layer;
    a bearing metal layer;
    a diffusion barrier layer, and an electroplated overlay, said bearing characterized by said bearing metal layer being selected from a group of alloys consisting of: Cu—Al, Cu—Zn, Cu—Zn—Si, Cu—Zn—Al and Cu—Al—Fe; and
    said bearing metal layer being formed of a lead free copper alloy having a copper content in the range of about 50 to 95 wt. % and said overlay being formed of a lead-free Sn—Cu alloy having copper in the range of about 3 to 20 wt. % and tin in the range of about 70 to 97 wt. %.

2. The material of claim 1 wherein said overlay includes at least one component selected from the group of materials consisting of: bismuth, silver and nickel in a proportion $\leq 20$ wt. %.

3. The material of claim 1 wherein said overlay includes a dispersion of hard particles selected from a group of particles consisting of: $Al_2O_3$, $Si_3N_4$, diamond, $TiO_2$, and SiC.

4. The material of claim 1 wherein said diffusion barrier layer comprises nickel.

5. The material of claim 1 wherein said diffusion barrier layer comprises a nickel layer having a thickness of about 1 to 3 $\mu$m and a nickel-tin layer having a thickness of about 2 to 10 $\mu$m.

6. The material of claim 1 wherein said diffusion barrier layer comprises a cobalt layer having a thickness of about 1 to 3 $\mu$m.

7. A multilayer plain bearing comprising:
    a metallic backing layer, a bearing metal layer, a diffusion barrier layer, and an electroplated overlay, said bearing characterized by said bearing metal layer selected from a group of alloys consisting of Cu—Al, Cu—Zn, Cu—Zn—Si, Cu—Zn—Al, and Cu—Al—Fe; said bearing metal layer being formed of a lead-free copper alloy having a copper content in the range of about 50 to 95 wt. % and said overlay being formed of a lead-free Sn—Cu alloy having copper in the range of about 3 to 20 wt. % and tin in the range of about 70 to 97 wt. %.

8. The bearing of claim 7 wherein said overlay includes at least one component selected from the group of materials consisting of: bismuth, silver and nickel in a proportion $\leq 20$ wt. %.

9. The bearing of claim 7 wherein said overlay includes a dispersion of hard particles selected from a group of particles consisting of: $Al_2O_3$, $Si_3N_4$, diamond, $TiO_2$, and SiC.

10. The bearing of claim 7 wherein said diffusion barrier layer comprises nickel.

11. The bearing of claim 7 wherein said diffusion barrier layer comprises a nickel layer having a thickness of about 1 to 3 $\mu$m and a nickel-tin layer having a thickness of about 2 to 10 $\mu$m.

12. The bearing of claim 7 wherein said diffusion barrier layer comprises a cobalt layer having a thickness of about 1 to 3 $\mu$m.

* * * * *